Sept. 11, 1934.                C. HELD                1,973,068
                           OIL FILLED CABLE
                         Filed May 25, 1931
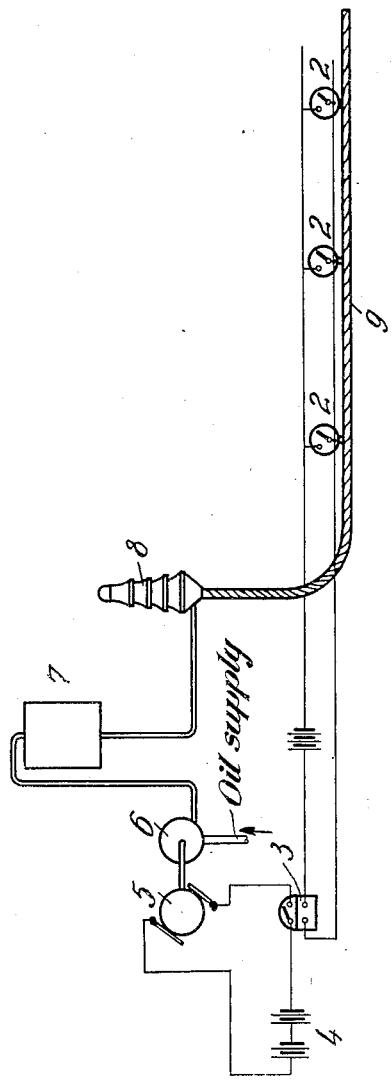

Patented Sept. 11, 1934

1,973,068

UNITED STATES PATENT OFFICE 1,973,068

OIL-FILLED CABLE

Christian Held, Berlin-Charlottenburg, Germany, assignor to Siemens-Schuckertwerke Aktiengesellschaft, Berlin-Siemensstadt, Germany, a corporation of Germany Application May 25, 1931, Serial No. 539,799
In Germany May 31, 1930

2 Claims. (Cl. 173—264)

My invention relates to improvements in oil-filled cables and more particularly to a device for maintaining a complete oil filling in an oil-filled cable.

Electric oil-filled cables, and especially cables of that kind for high voltage may be highly stressed as to the voltages to be transmitted, the currents, the permissible heating and also as to the occurring internal pressure. To utilize these stressing possibilities fully, it is useful to control the large fluctuations of temperature and pressure occurring in service. The dimensions of such cables may per se be made small, and the quantity of oil and the sectional areas through which the oil flows may in themselves also be small. Provision must, however, be made, especially in long cables, that there is always provided at all points the quantity of oil necessary for maintaining the dielectric strength, and particularly that an interruption in the flow of oil never occurs, for example when load is thrown off suddenly.

According to my invention this is achieved by means of a positively acting pressure device controlled by the service condition of the cable, said pressure device caring continually for a complete oil filling, by positively forcing oil into the cable in case of a threatened void at a particular point.

By the term "service condition" of the cable, used hereinabove and in the annexed claims, I mean the variable conditions which result from the operation of the cable, such as variable temperature conditions, variable pressure conditions due to temperature variations, and other influences, or also variable load conditions which may affect the oil temperature or pressure. Any of these variable conditions may be used according to my invention to positively control the oil supply to the cable.

My invention is illustrated in the accompanying drawing, in which

The figure diagrammatically illustrates the oil supply arrangement and its control by the cable service condition.

In the cable installation it is for example possible to arrange devices 2, which may either be responsive to pressure or temperature variations, at a number of points along the cable section, of which only one junction box is shown. Pressure or temperature responsive devices provided with contact arms are well-known in the art, and their detail construction is therefore not shown here. Each of the devices 2 has its contact mechanism, as shown, connected in parallel to the energizing circuit of a relay 3, so that in case any of the devices 2 responds, by moving its contact arm into closing position, the actuating circuit of relay 3 is closed, which latter in turn closes a power circuit containing a current source 4 and a motor 5. When the power circuit is closed, the motor 5 puts into operation a pump 6, which alters the pressure in the equalizing vessel 7 in communication with the pot head 8 of the cable 9 and thereby alters the flow of oil in the cable, by positively forcing oil into the cable section.

I claim as my invention:

1. In an oil-filled cable section, the arrangement for maintaining the oil filling complete, comprising means for positively forcing oil into the cable, a relay for controlling the operation of said forcing means, and a plurality of devices, each device being individually and independently responsive to the varying operating conditions of the cable and being spaced along the length of the cable section and having electric contact devices connected in parallel to said relay, so as to enable each of said devices to actuate said relay when the device responds to the varying cable operating conditions prevailing in its own vicinity, to set said forcing means into operation.

2. In an oil-filled cable section, the arrangement for maintaining the oil filling complete, comprising means for positively forcing oil into the cable, a relay for controlling the operation of said forcing means, and a plurality of pressure responsive electric contact devices, individually and independently responsive to the varying pressure condition in the cable prevailing in its own vicinity, said devices being spaced along the length of the cable section and connected electrically in parallel to said relay, so that when one of said devices closes its contact in response to the cable oil pressure variation in its own vicinity, the relay is actuated to set said forcing means into operation.

CHRISTIAN HELD.